United States Patent [19]

Maruyama et al.

[11] Patent Number: 5,497,374
[45] Date of Patent: Mar. 5, 1996

[54] DATA TRANSMISSION METHOD AND SYSTEM THEREOF

[75] Inventors: Hisayuki Maruyama, Ebina; Sadao Mizokawa, Katsuta; Seiichi Yasumoto, Hitachi; Ken Onuki, Hitachi; Hisao Ogawa, Hitachi; Junji Fukuzawa, Sagamihara; Toshihiko Uchiyama, Hitachi; Toshiyuki Murakami, Hitachi; Osamu Anbo, Hitachi; Masato Satake, Naka, all of Japan

[73] Assignees: Hitachi, Ltd., Tokyo; Hitachi Process Computer Engineering, Inc., Ibaraki, both of Japan

[21] Appl. No.: 299,634

[22] Filed: Sep. 2, 1994

Related U.S. Application Data

[63] Continuation of Ser. No. 495,750, Mar. 19, 1990, Pat. No. 5,426,638.

[30] Foreign Application Priority Data

Mar. 18, 1989 [JP] Japan ................................. 1-66595

[51] Int. Cl.⁶ ............................................. H04L 12/417
[52] U.S. Cl. .......................................... 370/85.4; 370/94.1
[58] Field of Search ................................. 370/85.4, 85.5, 370/94.1, 85.12, 85.15, 94.2, 85.6, 60, 60.1; 340/825.05, 825.5, 825.51

[56] References Cited

U.S. PATENT DOCUMENTS 5,068,849  11/1991  Tanaka ............................. 370/85.4
5,191,580  3/1993   Nakano et al. .................... 370/85.4

OTHER PUBLICATIONS

Translation of the relevant part of the Notice of Reasons for Refusal; and cited document 61-30834 and English Abstract.

Primary Examiner—Benedict V. Safourek
Assistant Examiner—Dang Ton
Attorney, Agent, or Firm—Antonelli, Terry, Stout & Kraus

[57] ABSTRACT

A data transmission method and system of a token passing type capable of periodically transmitting cyclic data produced in a station to other stations while enabling a packet data communication with high efficiency and without disturbing the periodicity of the cyclic communication. A token circulation time is set to be shorter than a cycle time for production of the cyclic data where no packet data to be transmitted. Also each station will pass an acquired token immediately to the next station if the station has no data to be transmitted. Thus, at least one station can have a token at least two times during the cycle time to transmit the cyclic data and the packet data. Upper limits may be set to capacities of the cyclic data and the packet data which are capable of being transmitted each time the token is acquired.

5 Claims, 8 Drawing Sheets

DATA TRANSMISSION METHOD AND SYSTEM THEREOF

This is a continuation of application Ser. No. 07/495,750 filed on Mar. 19, 1990 now U.S. Pat. No. 5,426,638.

BACKGROUND OF THE INVENTION

1) Field of the Invention:

The present invention relates to a data transmission system of a type wherein a plurality of stations are connected to a common transmission line employing a token which manages a data transmission right in the system, and specifically to a data transmission method which is capable of efficiently combining packet communication with cyclic data communication.

2) Background Art:

One conventional approach to manage a right to put data onto a transmission line or a right to use a communication network is known as a so-called token passing system which permits one station at a time to transmit data on condition that the station has a token or transmission permit. The transmission line for a data transmission system of the token passing type are classified into two large groups, i.e., a ring-type and a bus-type (including a star-type). In the ring type, the order in which the token is circulated among the stations is uniquely determined by order in which stations are connected to one another, while in the bus type the order can freely be set in accordance with the transmission protocol.

Figure 2:
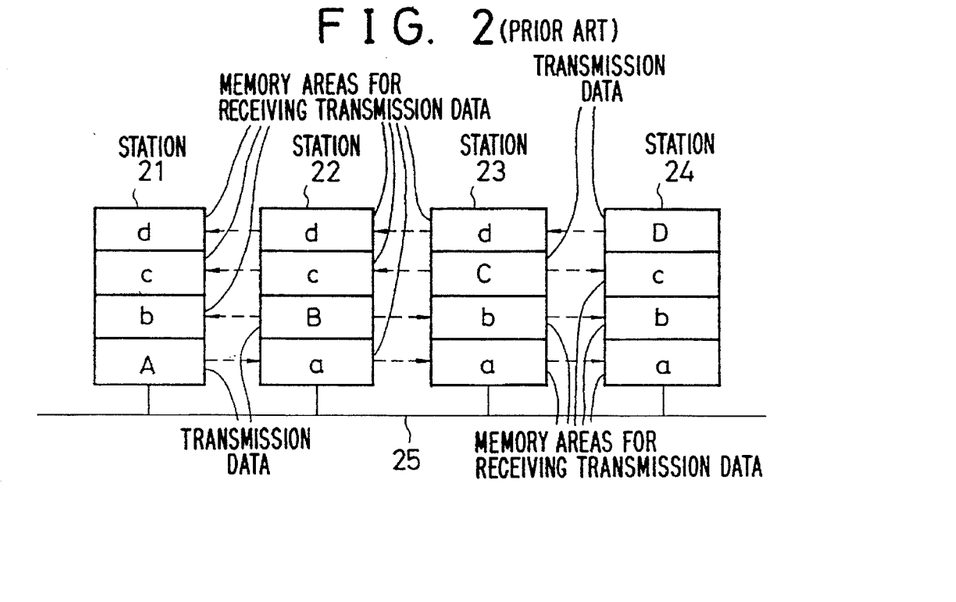
FIGS. 2 through 4 are schematic views for describing a conventional system.

FIG. 2 schematically shows the construction of a conventional bus-type data transmission system.

In the same drawing, each of stations (hereinafter be abbreviated "ST") 21, 22, 23 and 24 is connected to a transmission line 25. Let's now assume that each of the STs of 21 to 24 is performing a cyclic communication. The term "cyclic communication" means that cyclic data (such as sampling data or temperature data in a system to be monitored and controlled), which is periodically produced in a specific station, is periodically transmitted to each of the stations which requires the data. Each of the STs of 21 to 24 includes a cyclic memory thereinside. In the illustrative example, the ST 21 is a source from which data A is being transmitted and the transmission data is shown as "A". "a" of each of the STs of 22 to 24 represents a memory area for receiving the data A transmitted from the ST 21. Similarly, the ST 22 is a source from which data B is being transmitted, which transmission data is called "B". "b" of each of the STs 21, 23 and 24 represents a memory area for receiving the data B transmitted from the ST 22. Likewise, the transmission data of the ST 23 is taken as "C" and that of the ST 24 is taken as "D". Memory areas for receiving these transmission data are "c" and "d" respectively.

Figure 3:
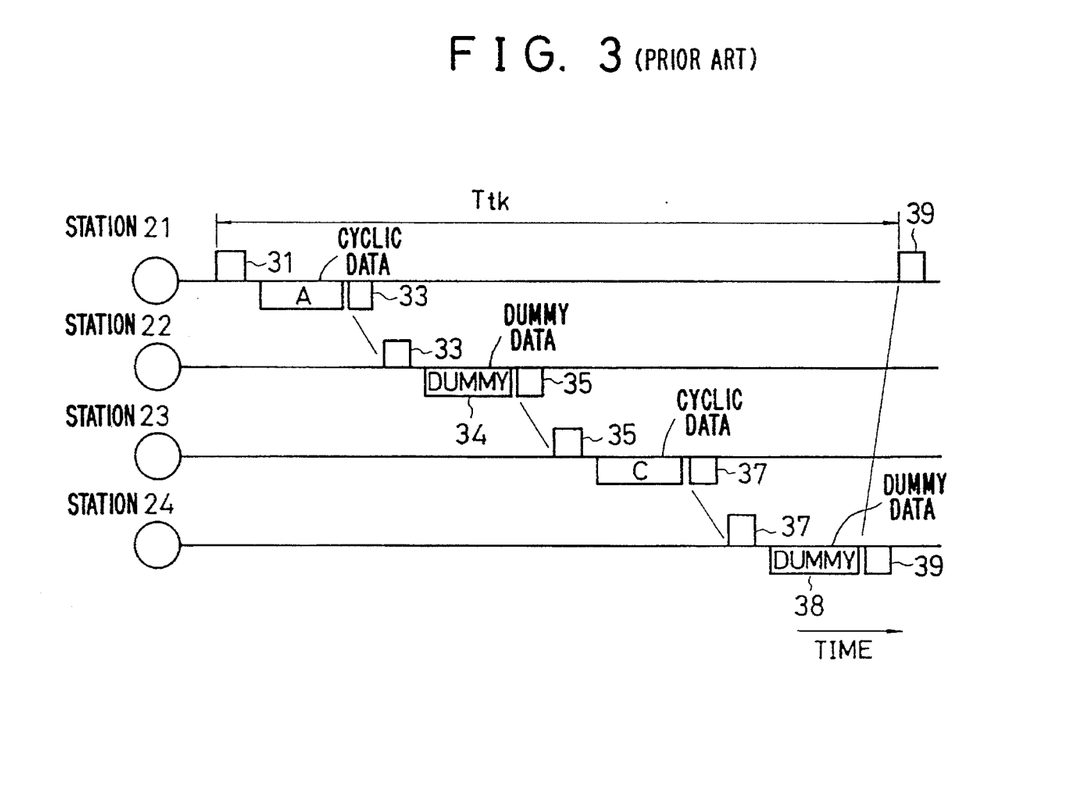

FIG. 3 is a timing chart of data flow in the cyclic communication which has been described with reference to FIG. 2. A token is sequentially delivered to each of the stations in accordance with the transmission protocol. When token 31 is received by the ST 21, a transmission right is given to the ST 21. As a consequence, the ST 21 puts the cyclic data A onto the transmission line 25. The same cyclic data A is received by other STs almost simultaneously with the transmission. However, a timing chart for describing its receiving process is omitted herein. Then, the ST 21 transmits token 33 and hence its transmission right is released. The token 33 is in turn acquired by the ST 22 in accordance with the transmission protocol. Upon receipt of the token, the ST 22 sends dummy data 34 to the transmission line 25 since no data to be transmitted therefrom is present in this example. The purpose of insertion of this dummy data is to ensure the periodicity of data to be transmitted under the cyclic communication among the STs 21, 22, 23 and 24. Accordingly, the data length of the dummy data 34 corresponds to that of the cyclic data B which would be transmitted if transmission data was present. Next, the ST 22 transmits token 35, which is in turn acquired by the ST 23 in accordance with the transmission protocol in the same manner as described above. The ST 23 transmits token 37 subsequent to transmission of the cyclic data C and hence its transmission right is passed to the following ST, i.e., the token 37 is acquired by the ST 24. The ST 24 transmits dummy data 38 in the same manner as in the ST 22 because of the absence of data to be transmitted. Subsequent operations are performed in a similar manner as in the above. Namely, token 39 is transmitted and then acquired by the ST 21 again.

A token circulation time $T_{tk}$, which is required to cause the token to circulate around all the stations in accordance with the above-described procedure, is assuredly maintained at a predetermined constant time, thereby establishing the periodicity in the cyclic communication.

Figure 4:
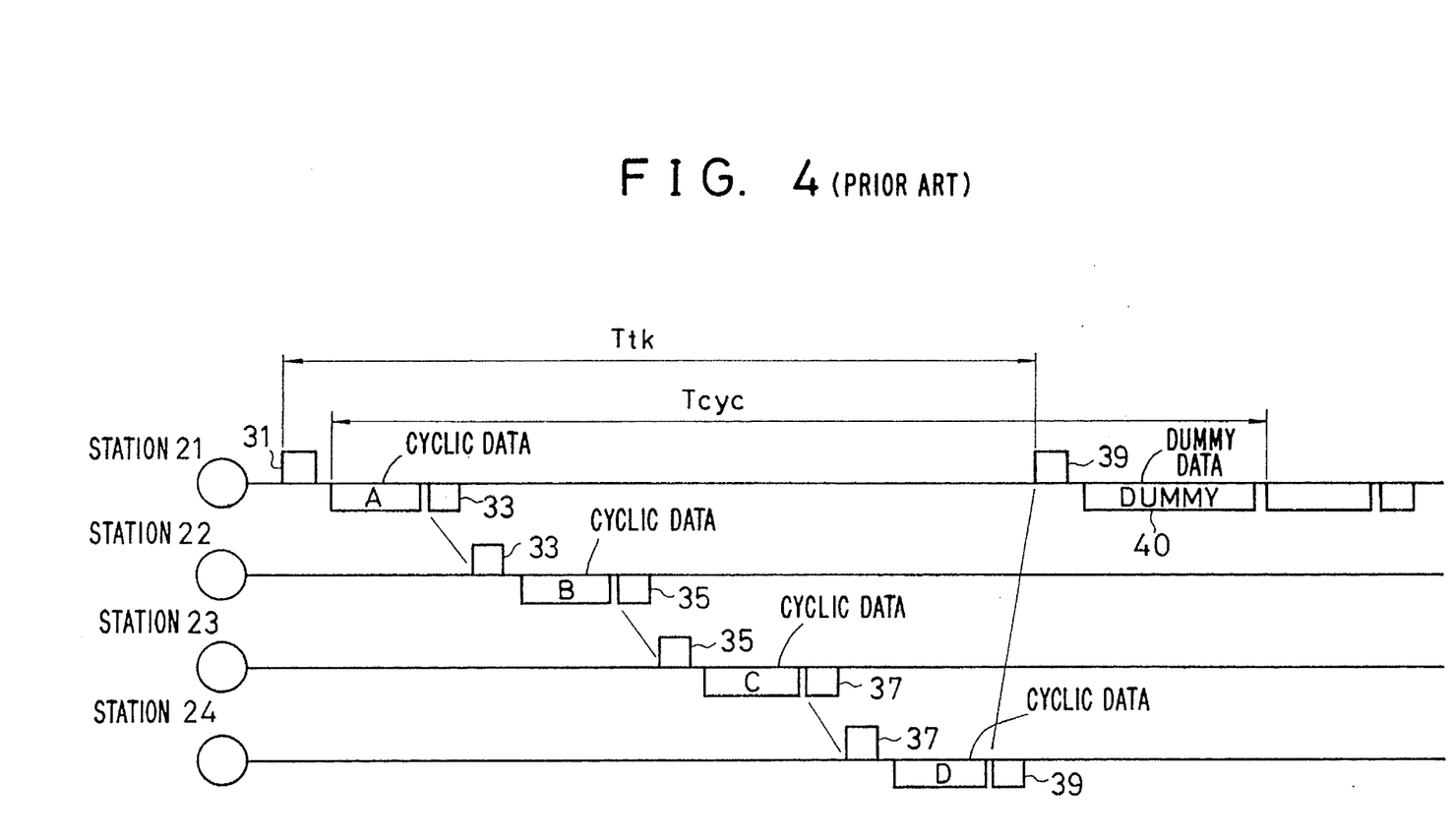

Another prior art approach is known for example in the article "Ohm", pp. 68–74, September 1987, which performs the cyclic communication through a local-area network (LAN) of a token passing bus type in accordance with IEEE 802.4. As shown in FIG. 4, this approach features that a cyclic data transmission cycle $T_{cyc}$ is set to a predetermined period of time by providing one ST (ST 21 in this shown case) which is to transmit dummy data and adjusting the time to transmit the dummy data 40. Incidentally, dissimilar to the example shown in FIG. 3, FIG. 4 shows one example in which the ST 22 transmits cyclic data B and the ST 24 transmits cyclic data D.

The above-described prior art can bring about good effects in the system in which only the cyclic communication is employed. A problem however arises in the case where it is desired to combine packet communication with cyclic communication.

In other words, a method for transmitting packet data in synchronism with the timing of transmission of cyclic data could be proposed to combine the packet communication with the cyclic communication. There is however a potential problem that the above-described cyclic data is impaired in periodicity of transmission because of the intervention of the packet communication.

The prior art in FIG. 3 described above is also accompanied by a problem that a throughput of the packet communication is deteriorated significantly. In addition, the prior art of FIG. 4 is also accompanied by a problem that only one transmission timing is provided within a cycle for production of cyclic data and the packet communication cannot be performed efficiently.

SUMMARY OF THE INVENTION

With the forgoing problems in view, the present invention has as its principal object the provision of a token-passing type data transmission method in which the throughput is less deteriorated even in the case where packet communication is combined with cyclic communication and no cyclic data is impaired in periodicity of the cyclic data communication.

In one aspect of the invention, there is provided a data transmission method wherein a transmission right is sequentially circulated among a plurality of stations to thereby allow one station at a time, which has the transmission right, to transmit data, and wherein at least one of the plurality of stations is adapted to transmit a periodically-produced data to other stations. The improvement includes defining a relationship between a circulation time, necessary for circulating the transmission right among all of the stations in transmitting the periodically-produced data only, and a cycle for data production such that the circulation time is rendered shorter than the cycle for data production; and causing each of the stations to pass the transmission right to the next station immediately after acquisition thereof unless the station has data to be transmitted.

In another aspect of this invention, there is provided a data transmission method wherein a transmission right is sequentially circulated among a plurality of stations to thereby allow one station at a time, which has the transmit right, to transmit data, and wherein at least one of the plurality of stations is adapted to transmit a first periodically-produced data to other stations. The improvement includes enabling said at least one station to transmit the first data and second data in combination or the second data singly upon acquisition of the transmission right; and determining the capacity of the first data such that where only said first data is transmitted, the station receives the transmission right at least two times during a period of time after production of the first data until the next production of the first data.

In this system, preferably upper limits are set to capacities of the first and second data which are capable of being transmitted upon each acquisition of the transmission right such that the transmission right is circulated at least one time within a cycle time at intervals of which the first data is produced.

In a further aspect of this invention, there is provided a data transmission system, wherein a transmission right is sequentially circulated among a plurality of stations to thereby allow one station at a time, which has the transmission right, to transmit data, and wherein at least one of the plurality of stations is adapted to transmit a periodically-produced cyclic data to other stations. The improvement includes enabling the at least one station to acquire the transmission right to transmit a packet data at the timing other than the timing of transmission of the cyclic data.

There is also provided another data transmission method according to the present invention, wherein a transmission right is sequentially circulated among a plurality of stations to thereby allow one station at a time, which has the transmission right, to transmit data, and wherein at least one of the plurality of stations is adapted to transmit a periodically-produced data to other stations. The improvement includes dividing a transmission frame to be occupied by the periodically-produced data into a plurality of blocks to assign each of the divided blocks to different cyclic data having different production cycles, for stations which are capable of producing plural types of data with different production cycle times.

In a still further aspect of this invention, there is provided a data transmission system of a type wherein a transmission right is sequentially circulated among a plurality of stations each connected to a transmission line to thereby allow one station at a time, which has the transmission right, to transmit data. The data transmission system provides that at least one station of said plurality of stations includes means for periodically producing a first data, means for transmitting the first data to the transmission line upon receipt of the transmission right, means responsive to a request-to-send of a second data other than the first data for transmitting the second data together with the first data or the second data singly to the transmission line, and means for providing an upper limit to the quantity of the first and second data to be transmitted or the time available to transmit the first and second data each time the transmission right is acquired.

There is also provided another data transmission system according to the present invention, of a type wherein a transmission right is sequentially circulated among a plurality of stations each connected to a transmission line to thereby allow one station at a time, which has the transmission right, to transmit data. The data transmission system provides that at least one station of the plurality of stations includes means for periodically producing a first data, means for transmitting the first data to the transmission line upon receipt of the transmission right, means responsive to a request-to-send of a second data other than the first data for transmitting said second data together with said first data or the second data singly to the transmission line, and means for providing an upper limit to the quantity of the second data to be transmitted or the period of time available to transmit the second data within the period of time after transmitting the first data until the following first data is transmitted.

The stations according to the present invention are suitable for use in the data transmission system of the token passing type, which includes means for producing a cyclic data; means for transmitting said cyclic data to a transmission line upon receipt of a token; means for transmitting a packet data together with the cyclic data or the packet data singly in response to a request-to-send of the packet data; and means for providing an upper limit to the quantity of the packet data to be transmitted or the time available to transmit the packet data within a cyclic data production cycle.

The cycle (the minimal cycle selected out of plural cycles if they exist) for production of cyclic data is used as a standard cycle in the cyclic communication in which periodically-produced data, i.e., cyclic data is transmitted to other stations successively each time the cyclic data is produced. In the present invention, the capacity of each cyclic data is determined so that the time necessary for the transmission right to be circulated is shorter than the standard cycle time where each of the stations transmits the cyclic data alone within the standard cycle time. In addition, each of the stations passes the acquired transmission right to the next station immediately if it has no data to be transmitted. As a consequence, each of the stations can have an opportunity to acquire a transmission right at least two times within the standard cycle time, provided that only cyclic data is transmitted.

Accordingly, each of the stations can transmit data at any one or all of opportunities to transmit data based on the transmission right which has been acquired by the station. In this case, data other than the cyclic data, i.e., packet data which are to be transmitted to any other station can be transmitted either in combination with the cyclic data or singly.

An upper limit is preferably set to the quantity of data which is allowed to be transmitted or the period of time available to transmit the data at each time the transmission right is acquired so that the circulation time of the transmission right is rendered shorter as compared with the standard cycle time in the cyclic communication. Thus, the periodicity in the cyclic communication is retained within an error span less than the time during which the transmission right alone is circulated among all stations one time, thereby avoiding inconvenience that new cyclic data is produced before transmitting the preceding cyclic data.

Specifically, the upper limits of the capacities of the cyclic and packet data in the present invention can be determined, when constructing the system, based on the cycle time for production of the cyclic data, the number of stations around which the transmission right is circulated, a data transfer rate on the transmission line and a transmission-right pass time (to be described as a token pass time hereinafter).

Thus, according to the present invention, it is feasible to combine the packet communication with the cyclic communication without disturbing the periodicity in the cyclic communication and without deteriorating the throughput.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE PREFERRED EMBODIMENTS

One embodiment of this invention will hereinafter be described in detail. A description will be made herein on, as one example, a data transmission system which makes use of a token bus-type network, which is similar to that shown in FIG. 2. The present embodiment is applicable even to a data transmission system, which utilizes other token passing type, for example, a token ring-type or the like.

Figure 5:
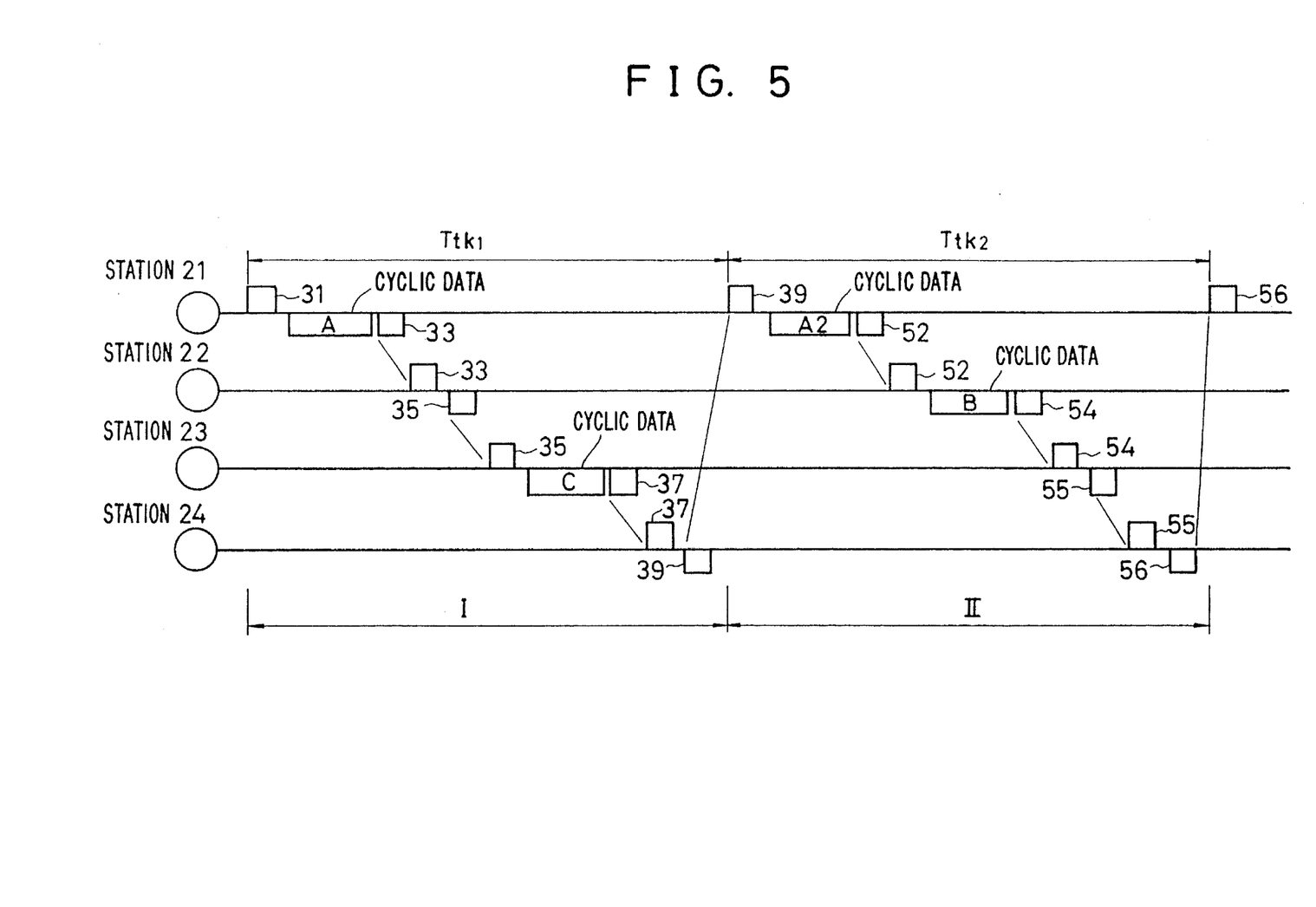
FIGS. 5 and 6 are schematic views for performing a supplementary explanation of the timing chart of FIG. 1.

A description will first be made to a token circulation time or a token round time which forms an important concept in the present invention with reference to FIG. 5. The cyclic operation in FIG. 5 has the following different features as compared with that in FIG. 3. When token 33 is received by ST 22, dummy data 34 is transmitted as shown in FIG. 3, while token 35 is immediately transmitted without transmission of dummy data in FIG. 5. Similarly, upon receipt of token 37 by ST 24, token 39 is immediately sent out without transmission of dummy data 38. Owing to the above-described operation, a token circulation time $T_{tk1}$ (which corresponds to a time interval I as shown in FIG. 5) in which ST 21 is taken as a reference can be rendered shorter than the time $T_{tk}$ shown in FIG. 3 by the time required to transmit the dummy data 34 and 38 shown in FIG. 3. Since cyclic data A2 to be transmitted has already been produced, the ST 21 transmits this data A2 to transmission line 25 (see FIG. 2). The ST 21 then transmits token 52 to relinquish its own transmission right. The token 52 is in turn acquired by ST 22 in accordance with the transmission protocol. Since cyclic data B to be transmitted has already been produced in ST 22 at this time, the ST 22 transmits cyclic data B to the transmission line 25. Token 54 is sent to ST 23 in the same manner as described above. However, the ST 23 transmits token 55 immediately since no data to be sent exist subsequently to the previous cyclic data C, which has been transmitted previously, at the time when the ST 23 has acquired the token. Similarly, the ST 24 also transmits the token 56 immediately because of absence of data to be sent at the time of acquisition of the token 55. Accordingly, a token circulation time becomes $T_{tk2}$ corresponding to a time interval II shown in FIG. 5, in the case where the ST 21 is taken as a reference. Where it is desired to apply such a system to cyclic communication, both of the token circulation times $T_{tk1}$ and $T_{tk2}$ must be shortened compared with a cyclic data transmission cycle time $T_{cyc}$.

Figure 1:
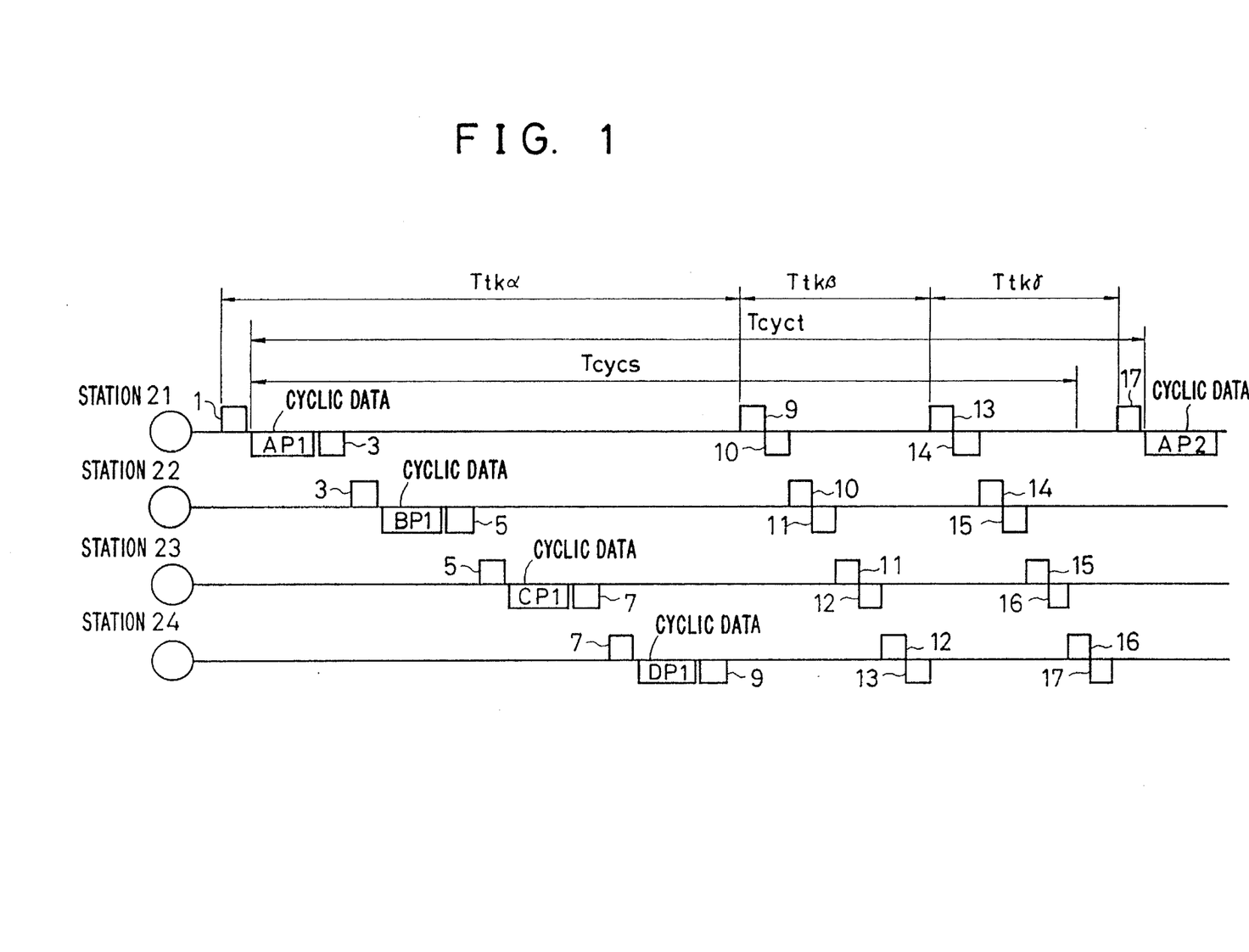
FIG. 1 is a timing chart for describing the flow of data to be transmitted along a transmission line in accordance with a data transmission method of the present invention.

FIG. 1 shows a timing chart for describing data flow in a data transmission system as one example in which the cyclic operation in FIG. 5 has been applied to both cyclic communication and packet communication.

Referring to FIG. 1, when token 1 is received by the ST 21, cyclic data (in which packet data may be included and the same applies correspondingly to the following) AP1 produced at the ST 21 is transmitted to the transmission line 25 (see FIG. 2). The ST 21 then transmits token 3 to relinquish its own transmission right. The token 3 is in turn acquired by ST 22 in accordance with the transmission protocol. The ST 22 transmits cyclic data BP1 which has been produced at the ST 22, to the transmission line. After that, the ST 22 sends token 5 to ST 23, thus passing the transmission right to the ST 23. After the ST 23 has transmitted cyclic data CP1, the ST 23 delivers token 7 to ST 24. After completion of transmission of cyclic data DP1, the ST 24 gives up token 9, which is in turn acquired again by the ST 21. In the above-described manner, the token, in which the ST 21 has been taken as a reference, is completely circulated. The time required to make one circulation or round of the token at this time is $T_{tk\alpha}$. the token at this time is $T_{tk\alpha}$.

At this time, the ST 21, which has received the token 9, has no cyclic data to be transmitted, since no elapse of time occurs yet to a standard cycle time $T_{cycs}$, which is required to periodically produce cyclic data. Accordingly, the ST 21 releases token 10 immediately. In the same manner, after the cyclic and packet data have been transmitted in accordance with the previous tokens, the STs 22, 23 and 24 also have no data to be transmitted owing to no elapse of the standard cycle time which is necessary for newly producing the cyclic data. Therefore tokens 11, 12 and 13 are immediately transmitted successively. Assuming that this token circulation or round time is taken as $T_{tk\beta}$, the following inequality is therefore established:

$$T_{tk\beta} < T_{tk\alpha}$$

In the next circulation of the token, since each of STs also has no data to be transmitted, tokens 14, 15, 16 and 17 are transmitted successively. Let's assume that the time required to complete this particular one circulation of the token is taken as $T_{tk\gamma}$. In this case, the following expression is obtained:

$$T_{tk\gamma} < T_{tk\alpha}, \quad T_{tk\gamma} \doteq T_{tk\beta}$$

Since the ST 21 is taken as a reference, the representation of time is performed only for the ST 21 in FIG. 1. The timing of transmission of the cyclic data by each of the STs 22, 23 and 24 is not in synchronization with the timing of transmission of data by the ST 21. Therefore, the actual case is not necessarily limited to the timing shown in FIG. 1. For example, the ST 22 may transmit cyclic data at the timing of receipt of the token 10. However, let's consider in the present embodiment that each of the STs 22, 23 and 24 has transmitted cyclic data in response to the timing shown in FIG. 1.

Now considering the standard cycle time $T_{cycs}$ required to produce the cyclic data in the ST 21 with reference to FIG. 1, since the standard cycle time $T_{cycs}$ used for production of the cyclic data terminates at the time before receipt of token 17 which is acquired after transmission of the token 14 in the ST 21, the ST 21 transmits cyclic data AP2 at the timing of receipt of the token 17. As a result, after transmitting the cyclic data AP1 the time $T_{cyct}$ has passed until the time ST 21 transmits the next cyclic data AP2. In FIG. 1, $T_{cyct}$ is greater than $T_{cycs}$ while ($T_{cyct}$—$T_{cycs}$) is equal to a cyclic period error. Since $T_{cycs}$ is timed independent of $T_{cyct}$, no superimposition of the cyclic period error occurs. The cyclic period error corresponds to a token alone circulation time with no data to be transmitted at the maximum. Therefore, if the standard cycle time $T_{cycs}$ is sufficiently greater as compared with the token alone circulation time, the cyclic period error may not be a problem in practical use. Where the token circulation time becomes greater and the cyclic period error exceeds the standard cycle time $T_{cycs}$, a token might not be acquired for a cyclic data until the next cyclic data is produced, thereby failing to transmit the preceding cyclic data.

Figure 6:
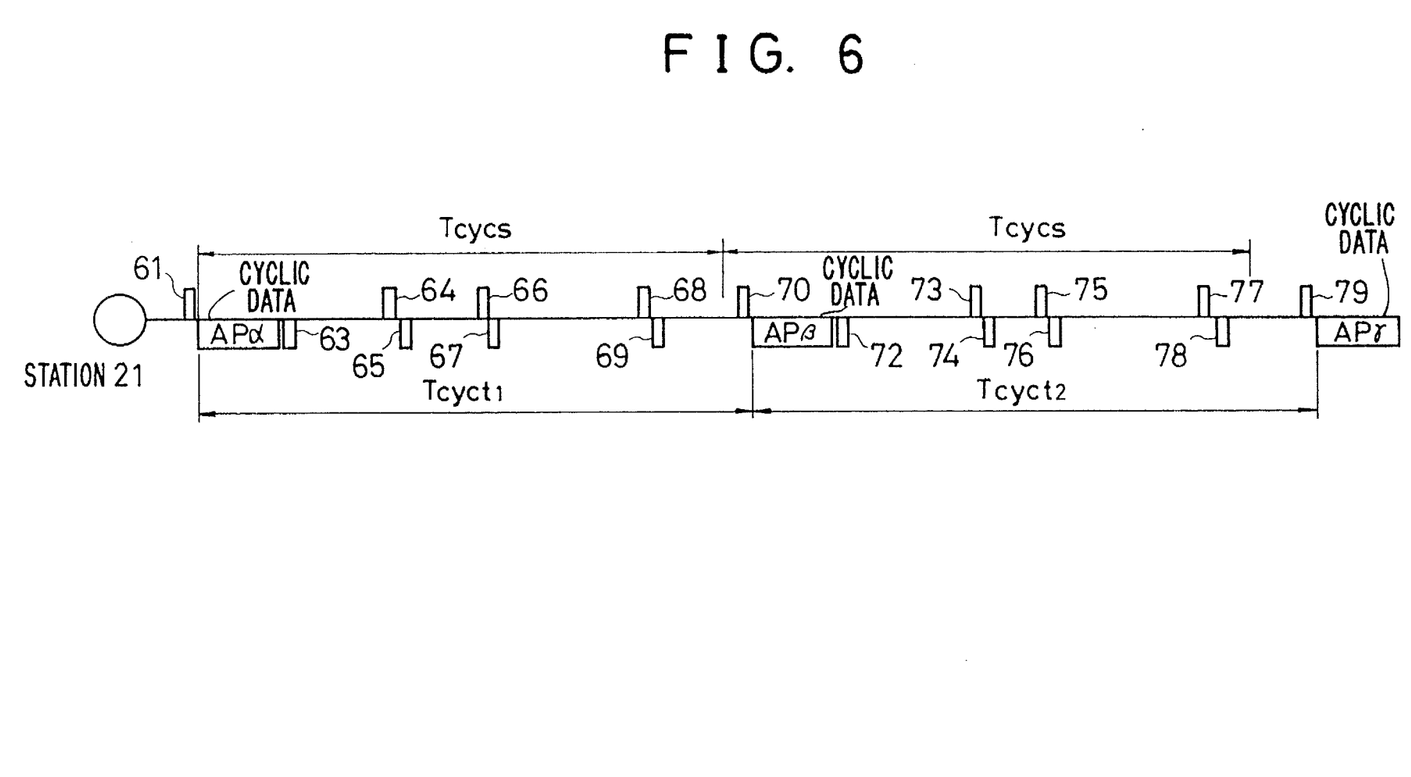

FIG. 6 shows the relation between the cycle time $T_{cyct}$ and the standard cycle time $T_{cycs}$ at the ST 21. The ST 21 receives token 61 and transmits cyclic data APα. The ST 21 thereafter receives tokens 64, 66 and 68 by the time the standard cycle time $T_{cycs}$ elapses to produce the succeeding cyclic data. For the tokens 64, 66 and 68, the ST 21 has no data to be transmitted and the ST 21 transmits tokens 65, 67 and 69 immediately as shown in FIG. 6. After the ST 21 has transmitted the token 69, the standard cycle time $T_{cycs}$ for production of the cyclic data elapses before receiving token 70. The ST 21 therefore transmits cyclic data APβ upon receipt of the token 70. After starting transmission of the cyclic data APα, it takes time $T_{cyct1}$ until the time starting transmission of the cyclic data APβ. Similarly, after starting transmission of the cyclic data APβ it takes $T_{cyct2}$ until the time starting transmission of cyclic data APγ, during which alternate transmission/reception of tokens are performed in order of 72, 73, 74, 75, 76, 77 and 78, 79.

Neither of the times $T_{cyct1}$ nor $T_{cyct2}$ is constant because of dependence on the token circulation time while the standard cycle time $T_{cycs}$ for production of the cyclic data is constant. Accordingly, for each of the times $T_{cyct1}$ and $T_{cyct2}$ with reference to the standard cycle $T_{cycs}$, the cyclic period error falls within the token alone circulation time.

Meanwhile, the present transmission system has been described on assumption that the cyclic and packet communications are employed in combination. However, it is also possible to singly use either the cyclic communication or the packet communication.

It may also be feasible to consider a system of a type wherein some of stations in the transmission system perform a combined operation of the cyclic communication and the packet communication and the remaining stations thereof perform either the cyclic communication or the packet communication. In this case, a station which performs the cyclic communication only can obtain a transmission timing in accordance with the standard cycle for production of the cyclic data, while a station which conducts only the packet communication transmits a packet data at the timing of receipt of a token in response to a request-to-send of the packet data. Also some stations may be included, which perform data reception only and do not perform data transmission. Needless to say, such stations do not fall within the stations which perform the token circulating operation.

Further, in order to extend the function of the system, the ST 21 may transmit only a packet data upon receipt of either token 9 or token 13 in FIG. 1, in addition to the cyclic and packet data AP1, AP2 to be transmitted at the timing of receipt of token in the combined operation of the cyclic and packet communications. However, if the packet data to be transmitted is too long, the token circulation is delayed in time, so that the cyclic period error between the times $T_{cycs}$ and $T_{cyct}$ becomes greater. Accordingly, in transmitting the packet data, time to transmit data (or the quantity of the data to be transmitted) is monitored by means of a timer or the like, or the data length is counted by means of a counter. When the count reaches a predetermined value, the data transmission is terminated, thereby preventing the actual token circulation time from being increased extremely.

In addition, the packet communication may include a 1:1 packet communication in which one of stations communicates with another station and further, a 1:N broadcast communication in which one of stations communicates with some or all of other stations at a time.

In FIG. 1, the standard cycle time $T_{cycs}$ for production of the cyclic data is determined equal to the minimum cycle time out of cycle times employed in all the stations to which the transmission right is circulated sequentially. In other words, the production of cyclic data is performed at intervals of the minimum cycle time in the transmission system. By counting cycles of the standard cycle time $T_{cycs}$, cyclic data to be transmitted at intervals of time longer than the minimum cycle time is produced each time the count reaches a value which corresponds to the longer cycle time (This will be described in detail with reference to FIG. 9).

Token circulation time varies depending on the number N of stations around which a token is circulated. A cyclic communication capacity per station is determined by the standard cycle time $T_{cycs}$, the number N, time required to pass a token (i.e., a token pass time) and a data transmission rate for transmitting data along the transmission line. The token pass time is defined by a period of time which elapses from the reception of a token by a station until the station gives up it at once. There exists a predetermined relationship between those parameters referred to above, as described later. Therefore, where it is desired to determine a certain parameter, it is necessary to know the values of the remaining parameters. Accordingly, in order to fix the above-described communication capacity in advance, it is necessary to adjust the values of other parameters.

Specifically, assuming that, in a system which has a transmission rate of 256 Kbyte/s on a transmission line, the minimum cycle time employed in the system which performs cyclic communication is set to, for example, 8 ms. This allows the system to transmit cyclic data of 2 Kbyte at the maximum within this minimum cycle time if a simple calculation is taken. However, if each of the stations connected to the transmission line transmits a desired quantity of cyclic data, the complete token circulation time would be delayed and in an extreme case, the token circulation time may exceed 8 ms of the standard cycle time. The token circulation time is determined in advance to thereby decide the upper limit of the cyclic communication capacity per station taking into consideration the number N of stations around which a token circulates. Specifically, a target value of the token circulation time is set within, for example, 4 ms relative to the system minimum cycle time 8 ms in view of sufficient allowances. Let's here assume that the token pass time per station is 0.2 ms, the upper limit of the cyclic communication capacity per station is Cd (byte) and the transmission rate is 0.8 μs/byte (10 Mbps). In this case, the following expression is established:

$$\{0.2(ms)+0.8(\mu s/byte) \times Cd(byte)\} \times N(stations) \leq 4(ms) \quad (1)$$

According to this relation, if N is four, Cd becomes 1 Kbyte, i.e., the upper limit of the cyclic communication capacity per station is determined equal to 1 Kbyte in the case of four stations. If the system is operated in accordance with this condition, transmission of only cyclic data allows the token to assuredly circulate at least two times around all the stations (except for stations having receiving functions alone) within the system minimum cycle time, i.e., the standard cycle time.

Similarly, let's here assume that the allowable time for transmitting packet data is set to Pt (ms). In this case, the above expression (1) may be modified to the following expression even in the case of the combined operation of the cyclic communication with the packet communication.

$$\{0.2(ms)+0.8(\mu s/byte) \times Cd(byte)+ Pt(ms)\} \times N(stations) \leq 4(ms) \quad (2)$$

Incidentally, the right part of the expression (1) has been set to 4 ms herein as in the expression (2) so that enough opportunities are given to enable the packet data alone to be transmitted. However, a value larger than 4 ms may be employed within a range of 8 ms.

Figure 7:
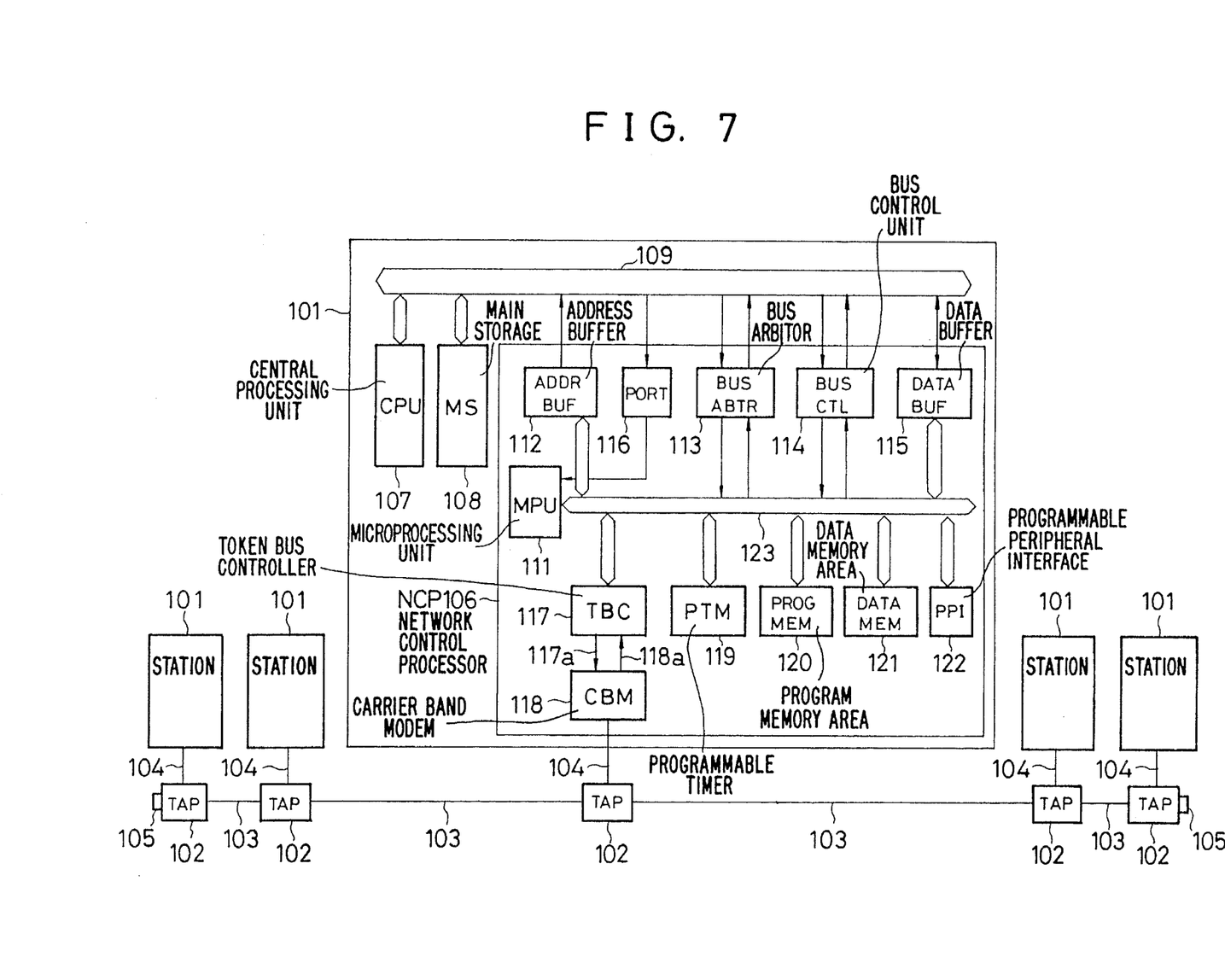
FIG. 7 is a block diagram showing one example of a station which performs cyclic and packet communications with a view toward realizing the present invention.

FIG. 7 shows a block diagram showing mainly one station in detail in which is employed in the system. Each of the STs 101 is connected to a single transmission line 103 through TAP cable 104 and TAP 102. Terminators 105 are provided at both ends of the transmission line 103.

The ST 101 is constructed of a central processing unit (CPU) 107, a system bus 109, a system memory MS 108 and a network control processor (NCP) 106, which are mutually connected via a system bus 109. In addition, the NCP 106 includes a microcomputer MPU 111, a microcomputer bus 123 which is to be controlled by the microcomputer, an address buffer (ADDR BUF) 112, a data buffer (DATA BUF) 115, a bus control unit (BUS ABTR) 113 and a bus control unit (BUS CTL) 114 both for acquisition of the system bus 109, and a bus port PORT 116. In addition, the NCP 106 performs exchange of information with respect to each of the CPU 107 and MS 108.

Also connected to the microcomputer bus 123 are a program memory (PROG MEM) 120, a transmission/reception buffer (DATA MEM) 121, a timer (PTM) 119 which is capable of being controlled by the microcomputer 111, and an LSI (PPI) 122 to be employed as a register or the like. A token bus controller (TBC) 117 connected to the microcomputer bus 123 performs control of the protocol associated with the transfer including, for example, transmission/reception of a token, etc. on the side of the transmission line 103. The TBC 117 applies an output signal 117a to a modem unit (CBM) 118. A modulated signal therefrom is delivered to the transmission line 103 through the TAP cable 104 and the TAP 102.

Also, a signal, which travels along the transmission line 103, is inputted to the CBM 118 via the TAP 102 and the TAP cable 104. A demodulated signal 118a from the CBM 118 is thereafter inputted to the TBC 117.

A process for transmitting and receiving the cyclic data and the packet data described with reference to FIG. 1 is as follows. The cyclic and packet data are temporarily stored into the DATA MEM 121 from the MS 108 through the DATA BUF 115 under control of the CPU 107. On the other hand, information about the standard cycle $T_{cycs}$ for production of the cyclic data and the packet-data transmission allowable time Pt are set in the PTM 119 by the MPU 111. The PTM 119 drives the TBC 117, at intervals of $T_{cycs}$, which in turn reads out cyclic data from the DATA MEM 121 and puts the data onto the transmission line 103 through the CBM 118. The TBC 117 is then allowed to take a packet data out of the DATA MEM 121 to transmit the data via the CBM 118 until time-out occurs for the packet-data transmission allowable time Pt in the PTM 119.

To the contrary, data received at the TBC 117 through the CBM 118 from the transmission line is checked whether the data is a cyclic data or packet data to be stored in a separate region of the DATA MEM 121. The MPU 111 transmits, as needed, the data to the MS 108 through the DATA BUF 115.

Incidentally, the values of $T_{cycs}$ and Pt are given as data to the MPU 111 from the CPU 107 or is given as packet data through the transmission line 103 from another ST. Each of the stations has a switch to select one of the two ways to get the values of $T_{cycs}$ and Pt. The switch information is applied to the MPU 11 through the PPI 122.

Figure 8:
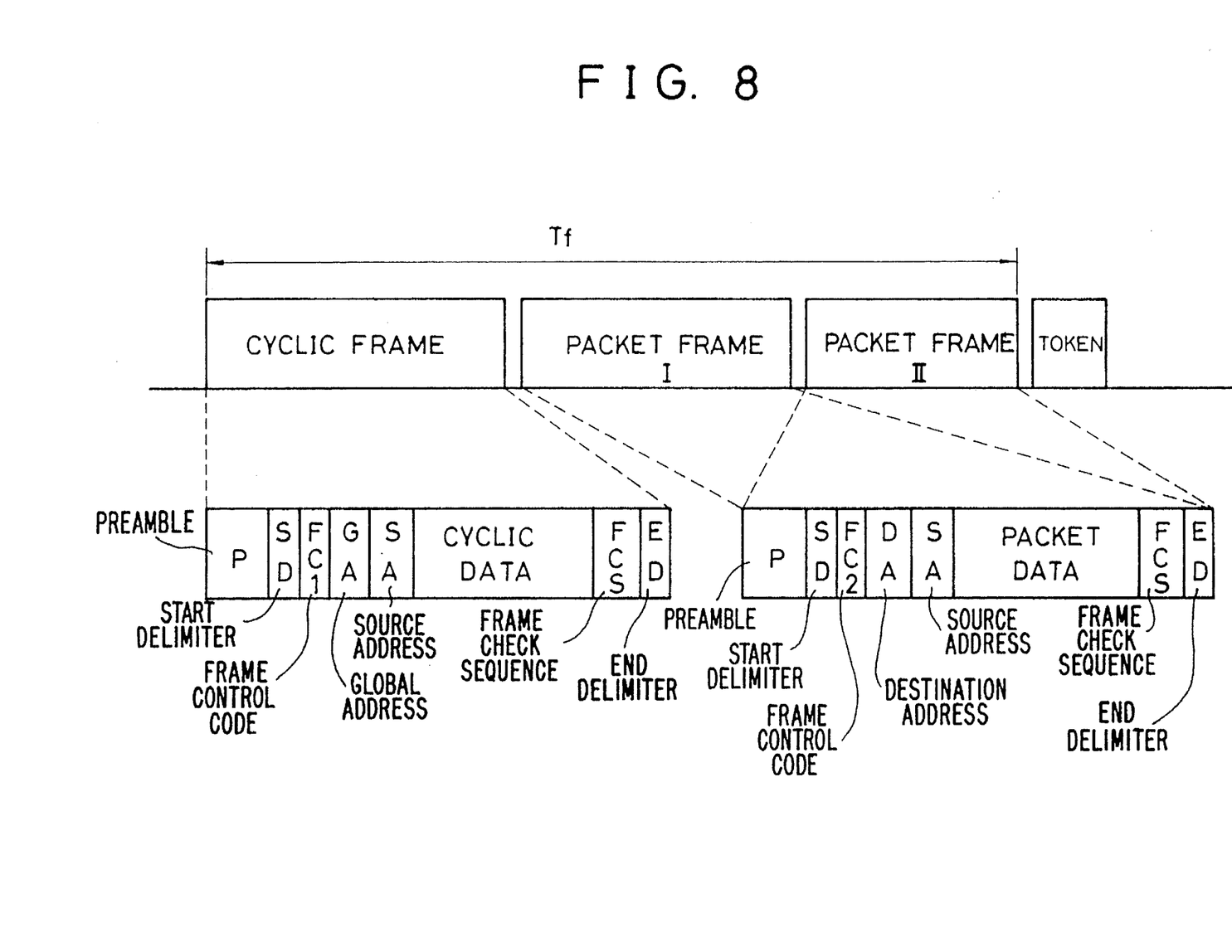
FIG. 8 is a format showing frames which include cyclic and packet data to be transmitted.

FIG. 8 shows a frame format which is employed in the communication of the present transmission system. The frame format is typically composed of one cyclic frame and a plurality of packet frames. This frame format may include either the cyclic frame only or the packet frames only as needed.

The cyclic frame is composed of a preamble P, a start delimiter SD, a frame control code FC1 to store information which presents that this frame is the cyclic frame, a global address GA which represents the frame to be delivered to all STs, a source address SA, a cyclic DATA to store cyclic-data therein, a frame check sequence FCS and an end delimiter ED.

The packet frame consists of a preamble P, a start delimiter SD, a frame control code FC2 in which commands or the like are contained, a destination address DA, a source address SA, a packet DATA to store packet-data therein, a frame check sequence FCS and an end delimiter ED. A period of time Tf shown in FIG. 8 represents time necessary for the ST to transmit the data frames. After transmitting the data frames, the ST sends a token to pass its transmission right to the next ST.

Figure 9:
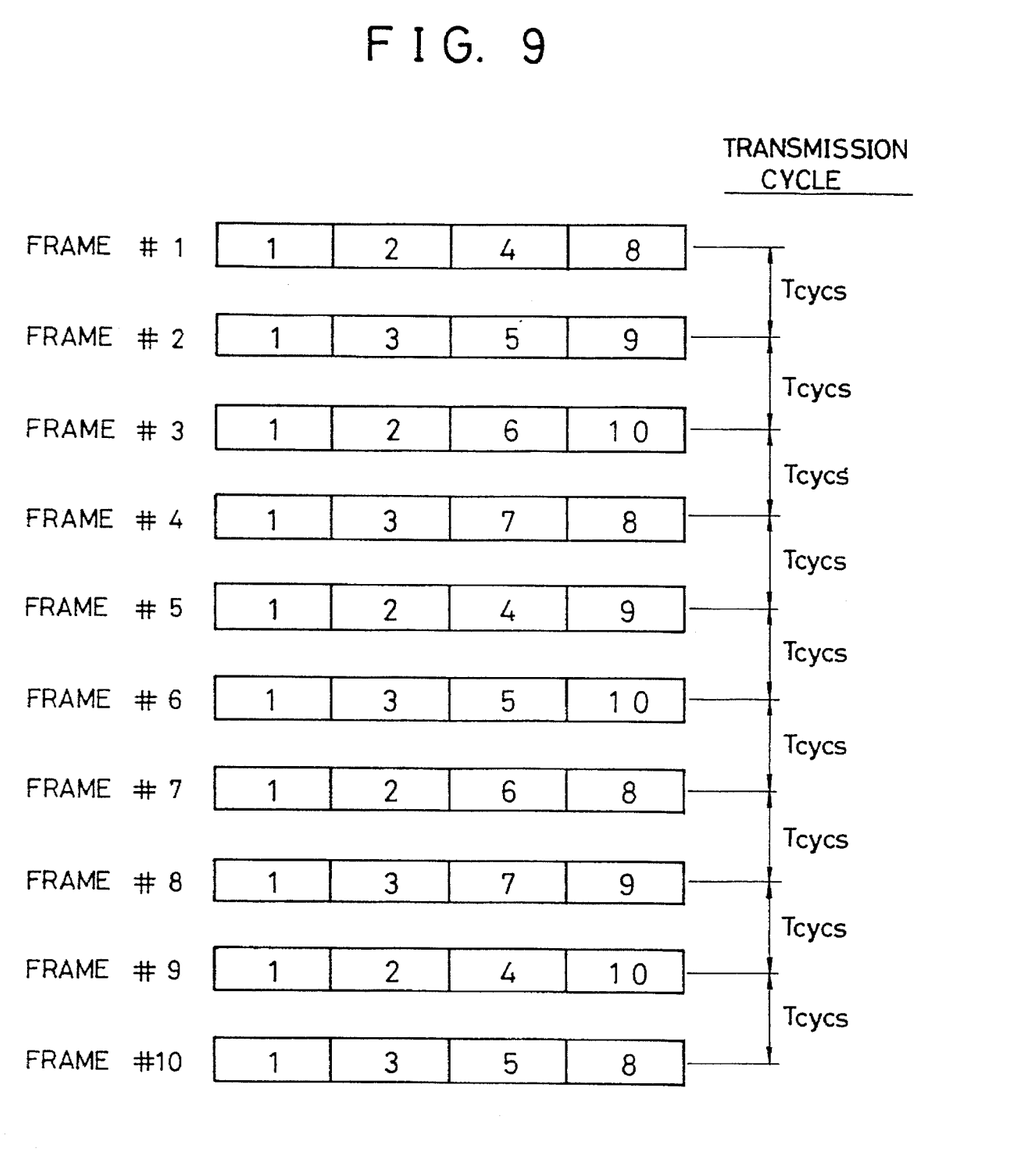
FIG. 9 is a schematic view for describing the principle of data arrangement for transmitting plural cyclic data having different production cycles under the cyclic communication.

FIG. 9 shows a frame structure for describing the principle of arrangement of cyclic data having different cycles to be transmitted based on the standard cycle time $T_{cycs}$. Numerals of "1" to "10" in FIG. 9 represent blocks of cyclic data. The block 1 is transmitted over all of first to tenth transmission frames and hence its transmission cycle time is equal to the standard cycle time $T_{cycs}$. The blocks 2 and 3 are transmitted every other frame and hence each of their transmission cycle times is equal to twice the standard cycle time $T_{cycs}$. The blocks 4, 5, 6 and 7 are transmitted every four frames and hence each of their transmission cycle times is equal to four times the standard cycle time $T_{cycs}$. Similarly, the blocks 8, 9 and 10 are transmitted every three frames and hence each of their transmission cycle times is three times the standard cycle time $T_{cycs}$.

It is therefore feasible to realize cyclic communication having periodicity of N times the standard cycle time $T_{cycs}$, based on the above-described principle, using the transmission frame of the standard cycle time $T_{cycs}$.

Having now fully described the invention, it will be apparent to those skilled in the art that many changes and modifications can be made without departing from the spirit or scope of the invention as set forth herein.

What is claimed is:

1. A data transmission method wherein a transmission right is sequentially circulated among a plurality of stations to thereby allow one station at a time, which has the transmission right to transmit data, and wherein at least one of said plurality of stations includes means for periodically producing cyclic data to be transmitted to the other stations, said method comprising the steps of:

allowing said at least one station to non-periodically produce non-cyclic data to be transmitted to other stations;

enabling, upon acquisition of said transmission right, said at least one station to selectively transmit said cyclic data alone or non-cyclic data alone or both cyclic and non-cyclic data in combination;

causing each of said plurality of stations to pass the transmission right to a next station immediately after acquisition thereof if said each of said plurality of stations has no data to be transmitted therefrom;

determining, for each of said plurality of stations, a capacity of said cyclic data to be transmitted at each time of acquisition of the transmission right such that when only said cyclic data is transmitted said at least one station receives the transmission right at least twice during a period of time after production of the cyclic data until a next production thereof; and setting, for each of said at least one station a limit to a capacity of the non-cyclic data to be transmitted at each time of acquisition of the transmission right such that the transmission right is circulated at least once within a cycle time of production of said cyclic data.

2. A data transmission method wherein a transmission right is sequentially circulated among a plurality of stations to thereby allow one station at a time, which as the transmission right, to transmit data, and wherein at least one of said plurality of stations includes means for periodically producing cyclic data to be transmitted to other stations, said method comprising the steps of:

allowing said at least one station to non-periodically produce packet data to be transmitted to other stations;

enabling, upon acquisition of said transmission right, said at least one station to transmit the cyclic data alone if said at least one station has only said cyclic data to be transmitted at that time;

enabling, upon acquisition of said transmission right, said at least one station to transmit the packet data alone if said at least one station has only packet data to be transmitted at that time;

enabling, upon acquisition of said transmission right, said at least one station to transmit the both cyclic and packet data in combination if said at least one station has both of said cyclic and packet data to be transmitted at that time;

causing each of said plurality of stations to pass the transmission right to a next station immediately after transmitting data therefrom;

causing each of said plurality of stations to pass the transmission right to a next station immediately after acquisition thereof if said each of said plurality of stations has no data to be transmitted therefrom;

determining, for each of said plurality of stations, a capacity of the cyclic data to be transmitted at each time of acquisition of the transmission right such that a circulation time necessary for circulating the transmission right among all of stations in transmitting the cyclic data only, is rendered substantially shorter than a cycle time for data production of the cyclic data; and setting, for each of said at least one station, a limit to a capacity of the packet data to be transmitted at each time of acquisition of the transmission right such that the transmission right is circulated at least once within a cycle time of production of said cyclic data.

3. A data transmission system of a type wherein a transmission right is sequentially circulated among a plurality of stations each connected to a transmission line to thereby allow one station at a time, which has the transmission right, to transmit data, at least one of said plurality of stations comprising:

means for periodically producing first data;

means for transmitting said first data to the transmission line upon receipt of said transmission right;

means, responsive to a request-to-send of second data other than said first data, for selectively transmitting said second data together with said first data or said second data alone to said transmission line, said second data being one periodically produced data;

means for passing the transmission right to a next station immediately after acquisition thereof if said at least one station has no data to be transmitted therefrom; and means for providing limits to the quantity of said first and second data to be transmitted or the period of time available to transmit said first and second data at each time of acquisition of the transmission right such that a circulation time, necessary for circulating the transmission right among all of stations in transmitting the first and second data, is rendered substantially shorter than a cycle time for producing first data.

4. A data transmission system of a type wherein a transmission right is sequentially circulated among a plurality of stations each connected to a transmission line to thereby allow one station at a time, which has the transmission right, to transmit data, at least one of said plurality of stations comprising:

means for periodically producing first data;

means for transmitting said cyclic data to a transmission line upon receipt of a token;

means for selectively transmitting packet data together with said cyclic data or said packet data alone in response to a request-to-send of said packet data;

means for passing the token to a next station immediately after acquisition thereof if said at least one station has no data to be transmitted therefrom; and means for providing a limit to a quantity of said packet data to be transmitted or a time available to transmit said packet data at each time of acquisition of the transmission right such that the token is circulated at least once within a cycle time of production of said cyclic data.

5. A station suitable for use in a data transmission system of a token passing type, said station comprising:

means for producing cyclic data;

means for transmitting said cyclic data to a transmission line upon receipt of a token;

means for transmitting packet data together with said cyclic data or said packet data alone in response to a request-to-send of said packet data;

means for passing the token to a next station immediately after acquisition thereof if the station has no data to be transmitted therefrom; and means for providing a limit to a quantity of said packet data to be transmitted or a time available to transmit said packet data within a cycle time of production of said cyclic data such that the token is circulated at least once within a cycle time of production of said cyclic data.

* * * * *